US012633267B1

(12) United States Patent
Lanoye et al.

(10) Patent No.: US 12,633,267 B1
(45) Date of Patent: May 19, 2026

(54) METHOD AND SYSTEM FOR GENERATING AN EXTENSION IMAGE FROM VISUAL CONTENT RENDERED ON A DISPLAY APPARATUS

(71) Applicant: Top Victory Investments Limited, Hong Kong (HK)

(72) Inventors: Lieve Lea Andrea Lanoye, Ghent (BE); Nicolas Philippe Henry Babled, Ghent (BE); Dieter Marcel Freddy Verlinde, Ghent (BE); Nicholas Rory Frame, Ghent (BE)

(73) Assignee: TOP VICTORY INVESTMENTS LIMITED, Hong Kong (HK)

( * ) Notice: Subject to any disclaimer, the term of this patent is extended or adjusted under 35 U.S.C. 154(b) by 0 days.

(21) Appl. No.: 19/049,902

(22) Filed: Feb. 10, 2025

(30) Foreign Application Priority Data

Dec. 27, 2024 (EP) .................................... 24307321

(51) Int. Cl.
*G09G 3/34* (2006.01)
*G06V 10/74* (2022.01)
*G06V 20/20* (2022.01)
*G06V 20/40* (2022.01)
*G06V 20/70* (2022.01)
*G09G 3/3208* (2016.01)

(52) U.S. Cl.
CPC ......... *G09G 3/3426* (2013.01); *G06V 10/761* (2022.01); *G06V 20/20* (2022.01); *G06V 20/46* (2022.01); *G06V 20/70* (2022.01); *G09G 3/3208* (2013.01); *G09G 2320/062* (2013.01); *G09G 2320/0686* (2013.01); *G09G 2354/00* (2013.01)

(58) Field of Classification Search
CPC ............... G09G 3/3426; G09G 3/3208; G09G 2320/062; G09G 2320/0686; G09G 2354/00; G06V 10/761; G06V 20/20; G06V 20/46; G06V 20/70
See application file for complete search history.

(56) References Cited

U.S. PATENT DOCUMENTS

| | | | | |
|---|---|---|---|---|
| 8,233,033 | B2 * | 7/2012 | Aarts ................... | H05B 47/155 348/51 |
| 2012/0223885 | A1 * | 9/2012 | Perez ..................... | A63F 13/26 345/158 |
| 2014/0051510 | A1 * | 2/2014 | Benko ..................... | A63F 13/26 463/31 |
| 2014/0320825 | A1 * | 10/2014 | Kim ..................... | H04N 9/3194 353/30 |
| 2018/0103287 | A1 * | 4/2018 | Reichow .............. | H04N 9/3141 |
| 2023/0217568 | A1 * | 7/2023 | Younessian .......... | G06V 40/172 315/152 |

* cited by examiner

*Primary Examiner* — Premal R Patel
(74) *Attorney, Agent, or Firm* — HSML P.C.

(57) ABSTRACT

A method for generating an extension image from a video frame is provided. The method is implemented using a display apparatus system and includes: in response to receipt of the video frame, processing the video frame to detect a target object therefrom, and executing a generative algorithm to generate the extension image based on the target object; and presenting the video frame and the extension image, the extension image serving as an extension of the video frame.

13 Claims, 7 Drawing Sheets

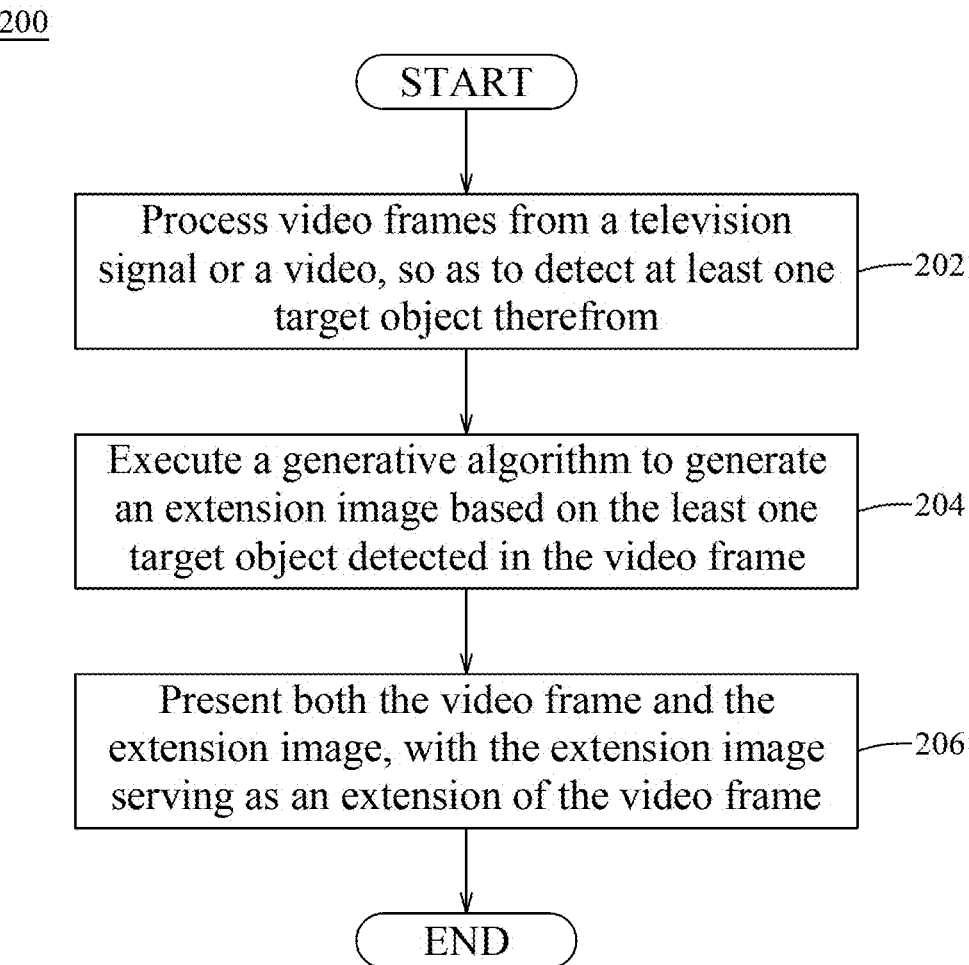

200

START

Process video frames from a television signal or a video, so as to detect at least one target object therefrom — 202

Execute a generative algorithm to generate an extension image based on the least one target object detected in the video frame — 204

Present both the video frame and the extension image, with the extension image serving as an extension of the video frame — 206

END

FIG. 3

METHOD AND SYSTEM FOR GENERATING AN EXTENSION IMAGE FROM VISUAL CONTENT RENDERED ON A DISPLAY APPARATUS

CROSS-REFERENCE TO RELATED APPLICATION

This application claims priority to European Patent Application No. EP24307321, filed on Dec. 27, 2024, the entire disclosure of which is incorporated by reference herein.

FIELD

The disclosure relates to a method and a system for generating an extension image from visual content rendered on a display apparatus.

BACKGROUND

In the field of display apparatus, a bias lighting effect (e.g., the backlight effect) of a display apparatus has become a popular feature. It reduces eye strain while increasing immersion. While the display apparatus is displaying an image (e.g., from a video or a television signal), a lighting module of the display apparatus would project a backlight signal on a surface (e.g., a wall) behind the display apparatus. The backlight signal is typically projected outwardly from the edges of the screen of the display apparatus, and therefore, from the perspective of a viewer in front of the television screen, the projected backlight signal would surround the screen and appear to expand the screen. As such, the backlight signal may complement the video frame to give the viewer a more immersive experience. A video frame hereafter is for instance, but not limited to, a frame containing any multimedia content such as video (regardless of the source), image (regardless of the source) or a graphical representation (for instance, user interface) shown on the display apparatus.

Typically, the backlight signal is generated by the display apparatus based on the video frame that is currently being displayed by the display apparatus. For example, the display apparatus may, for each border of the video frame that is being displayed on a corresponding edge of the screen, detect a number of characteristics of the border (e.g., color, luminance, texture, orientation, etc.), and generate the backlight signal by reproducing the number of characteristics detected on the border. As a result, the backlight signal may be projected so as to give the effect of "copying" parts of the video frame at the borders.

SUMMARY

Therefore, one object of the disclosure is to provide a method for generating an extension image from an image that aims to give the viewer an even better experience.

According to one embodiment of the disclosure, there is provided a method for generating an extension image from a video frame. The method is implemented using a display apparatus system and includes the steps of:

in response to receipt of a video frame, processing the video frame to detect a target object therefrom, and executing a generative algorithm to generate the extension image based on the target object; and presenting the video frame and the extension image, wherein the extension image serves as an extension of the video frame.

Another object of the disclosure is to provide a display apparatus system that is capable of implementing the above-mentioned method.

According to one embodiment of the disclosure, there is provided a display apparatus system for generating an extension image from a video frame. The display apparatus system comprising a processor and a screen.

In response to receipt of the video frame, the processor processes the video frame to detect a target object therefrom, and executes a generative algorithm to generate the extension image based on the target object.

The processor controls the screen to present the video frame, and presents the extension image, wherein the extension image serves as an extension of the video frame.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 3 is a flow chart of a method for generating an extension image from a video frame according to one embodiment of the disclosure.

DETAILED DESCRIPTION

Figure 1:
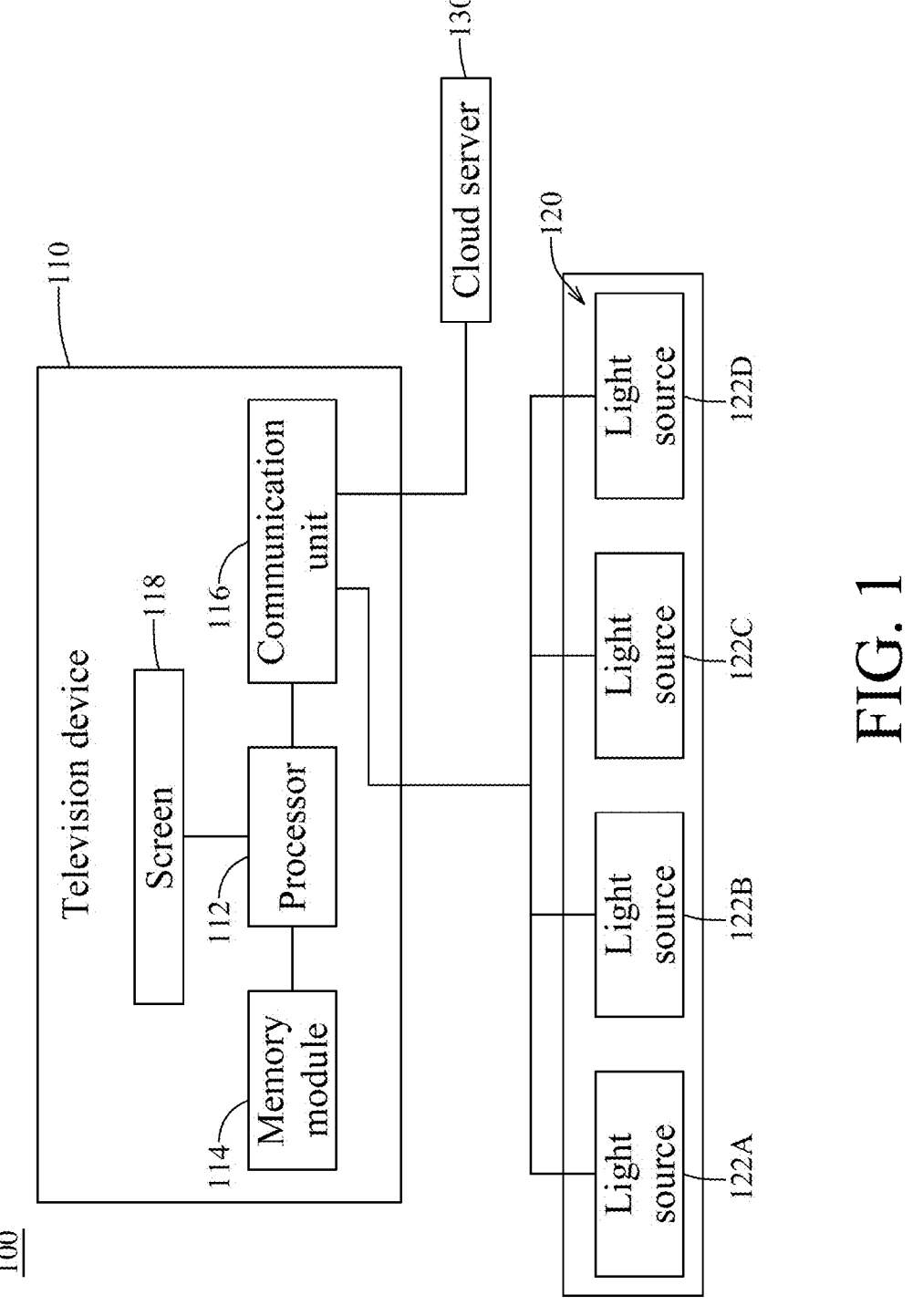
FIG. 1 is a block diagram illustrating a display apparatus system that is configured to generate an extension image from a video frame according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

FIG. 1 is a block diagram illustrating a display apparatus system 100 that is configured to generate an extension image from a video frame according to one embodiment of the disclosure.

The display apparatus system 100 includes a display apparatus 110 and a backlight projection unit 120.

The display apparatus 110 includes a processor 112, a memory module 114, a communication unit 116, and a screen 118.

The processor 112 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The memory module 114 may be embodied using, for example, random access memory (RAM), read only memory (ROM), programmable ROM (PROM), firmware, and/or flash memory, etc. The memory module 114 stores a software application including instructions that, when executed by the processor 112, cause the processor 112 to perform operations as described below.

The communication unit 116 may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) or fifth generation (5G) of wireless mobile telecommunications technology, or the like. The display apparatus 110 is configured to communicate with the backlight projection unit 120, a cloud server 130 (in some embodiments) or a network (e.g., the Internet) using the communication unit 116.

The screen 118 is connected to the processor 112, the memory module 114, and communication unit 116, and may be embodied using a light-emitting diode (LED) display, an organic light-emitting diode (OLED) display, or other suitable display equipment. In use, the screen 118 may receive an input signal carrying visual information. The input signal may be in various forms, such as a television signal, a video or an image from an external device (for instance, through a High Definition Multimedia Interface (HDMI) or a universal serial bus (USB) cable), a video or an image received from the network (e.g., an online video platform such as YouTube©) via the communication unit 116, etc. The screen 118 may be controlled by the processor 112 to display the input signal or the video. It is noted that the input signal or the video may be in the form of a number of successive video frames. The term "video frame" hereafter refers to a frame containing any multimedia content such as video (regardless of the source), image (regardless of the source) or a graphical representation (for instance, a user interface) shown on the screen 118. In use, the screen 118 is generally disposed in front of a wall surface.

The backlight projection unit 120 includes one or more light sources 122. In the embodiment of FIG. 1, four light sources 122 (respectively labeled 122A, 122B, 122C and 122D) are present. The light sources 122 are connected to the processor 112 through the communication unit 116, and are configured to project light outwardly (e.g., onto the wall surface behind the screen 118). Each of the light sources 122 may be embodied using a commercially available light projector, or other non-projector light sources that are capable of projecting specific shapes of light on the wall surface. It is noted that in some embodiments, the backlight projection unit 120 may be integrated into the back surface of the screen 118.

Figure 2:
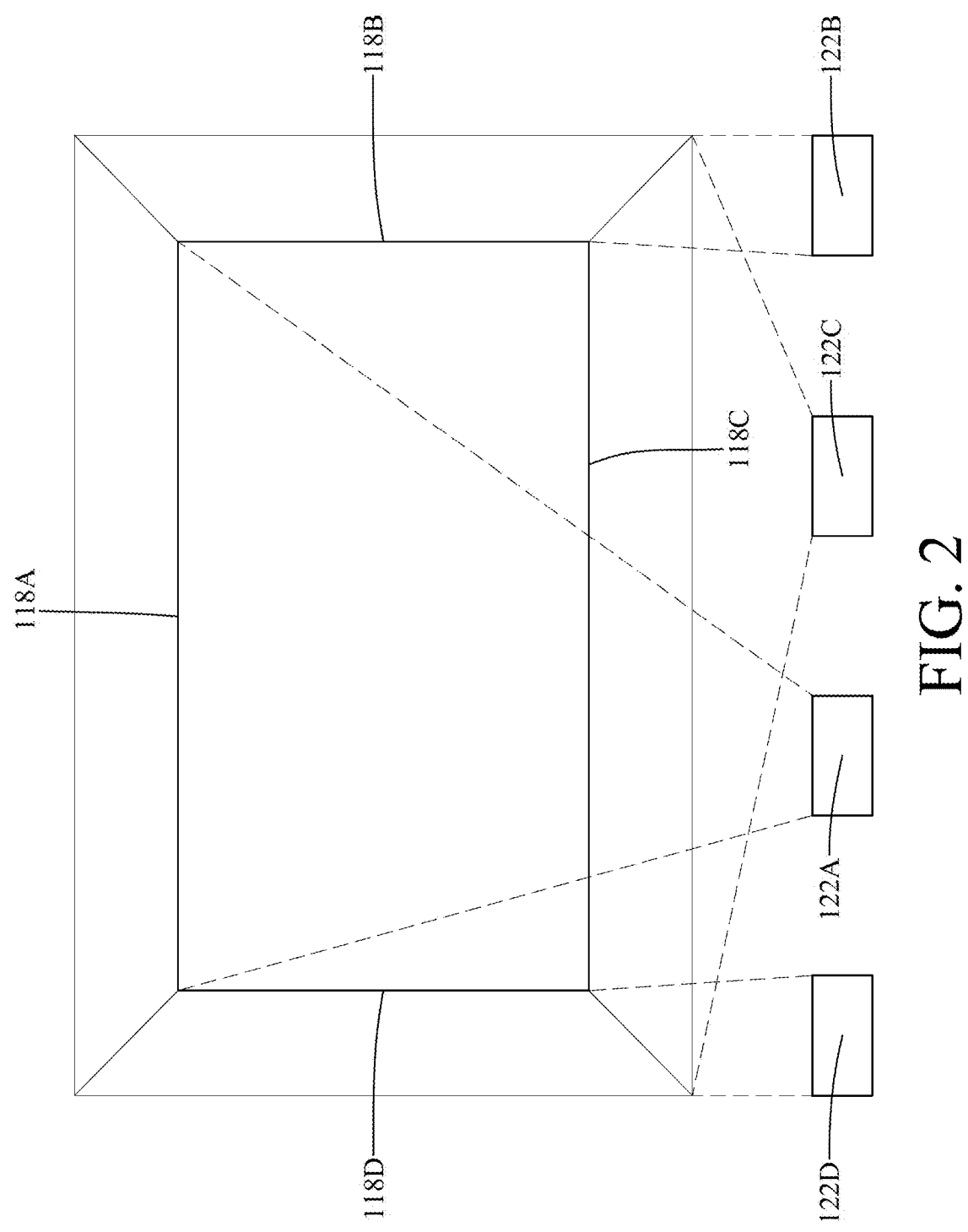
FIG. 2 illustrates an exemplary configuration of a display apparatus, and four backlight projectors configured to project light outwardly of four edges of the display apparatus, respectively.

For example, as shown in FIG. 2, the screen 118 has four edges (labeled 118A, 118B, 118C and 118D, respectively), and the four light sources 122 may be configured to project light at a predetermined section of the wall surface near the edges, respectively. It is noted that the configuration as shown in FIG. 2 is merely one exemplary configuration, and in other embodiments, different numbers of light sources 122 may be employed to project light in different directions (e.g., at different parts of the wall surface).

The cloud server 130 is connected to the display apparatus 110, and may provide the display apparatus 110 with the software application used in this disclosure. It is noted that in some embodiments, the display apparatus 110 may implement the operations as described below alone without connecting to the cloud server 130, and may connect to the cloud server 130 for the purpose of updating the software application. Alternatively, the display apparatus 110 may be embodied without the capability of connecting to the cloud server 130, and the software application may be obtained using other means.

In use, when the display apparatus 110 is powered on, the processor 112 receives the television signal or the video, and controls the screen 118 to display the television signal or the video in the form of successive images. While the screen 118 is displaying the television signal or the video, a user may operate an interface (e.g., a remote control that is not depicted in the drawings) to activate a backlight projection function. Alternatively, the backlight projection function may be activated by default when the display apparatus 110 is powered on.

In response to the activation of the backlight projection function, the processor 112 may execute a software application stored in the memory module 114 to implement a number of operations to generate a backlight projection signal that enables the backlight projection unit 120 to project an extension image (e.g., on the wall surface), so as to provide a backlight effect.

FIG. 3 is a flow chart of a method 200 for generating an extension image from a video frame according to one embodiment of the disclosure. In this embodiment, the method 200 is implemented by the display apparatus system 100 as described in FIG. 1.

In step 202, in response to receipt of a signal to activate the backlight projection function, the processor 112 processes the video frames from the television signal or the video, so as to detect at least one target object therefrom.

In a case where the backlight projection function is activated by default when the display apparatus 110 is powered on, the method would be initiated as soon as the display apparatus 110 is powered on.

Figure 4:
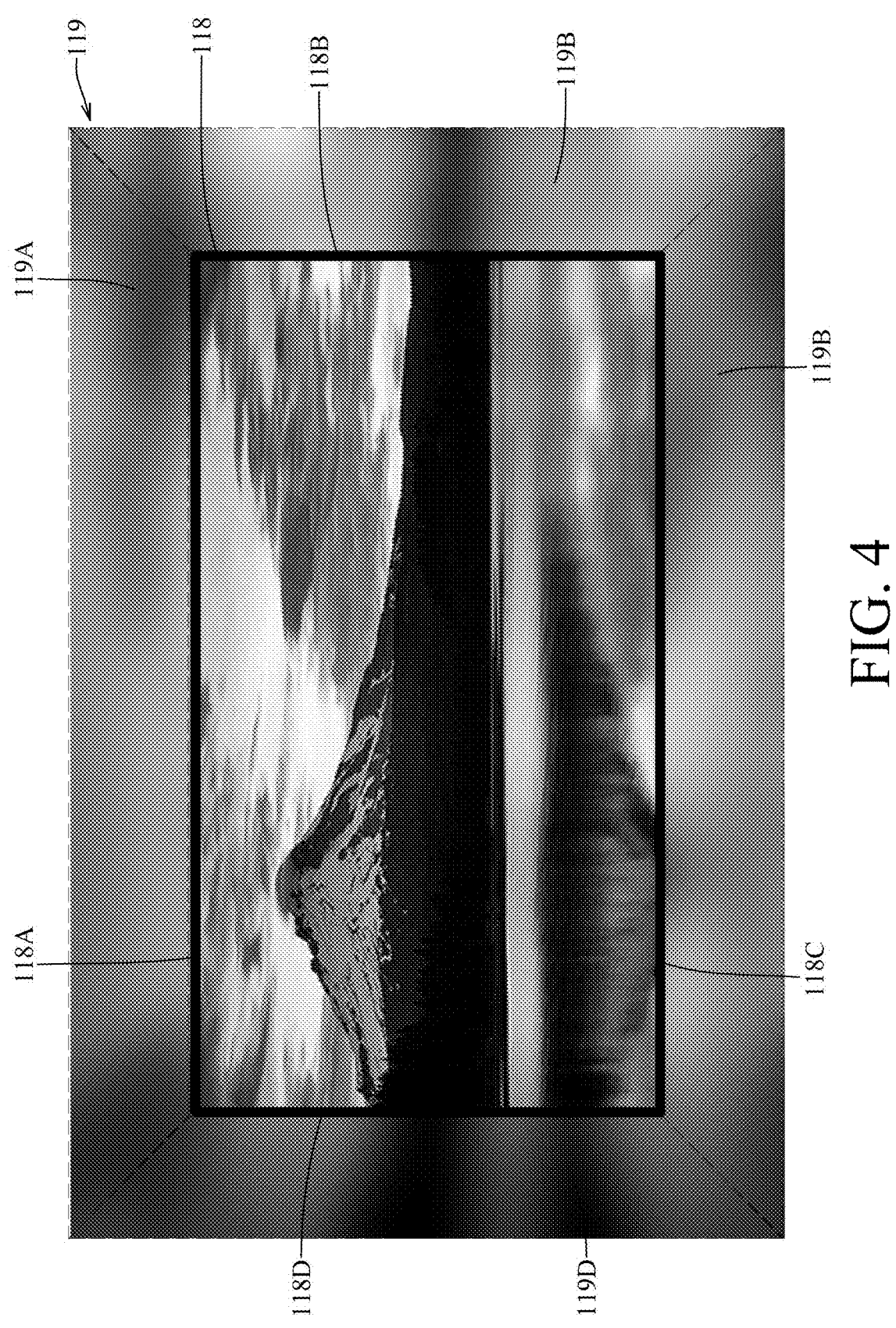
FIG. 4 illustrates an exemplary video frame that is displayed by the screen and an exemplary extension image that is generated according to one embodiment of the disclosure.

FIG. 4 illustrates an exemplary video frame that is displayed by the screen 118. In this embodiment, the video frame contains a body of water, a mountain, a plurality of trees, a plurality of clouds and the sky. A reflection of the mountain is also visible in the body of water. In processing of the video frame, the processor 112 may detect objects in the video frame and determine whether the object is to serve as a target object and/or background. For example, the sky in the video frame of FIG. 4 may serve as the background, and the mountain may serve as both a target object and the background. In embodiments, the processor 112 also determines a plurality of characteristics of a background of the video frame. In embodiments, the characteristics may include color, luminance, texture, orientation, etc.

Then, in step 204, the processor 112 executes a generative algorithm to generate an extension image based on the least one target object.

In different embodiments, the extension image may be intended to be projected outwardly of the screen 118 onto different parts of the wall surface, in order to achieve the backlight effect. In the embodiment of FIG. 4, the extension image may be composed using a plurality of extension sub-images that are generated with respect to the four edges of the screen 118. In some embodiments, the extension image may be generated with respect to only one edge of the screen 118.

In some embodiments, the video frames of the television signal or the video may have an aspect ratio that is different from that of the screen 118 (e.g., when a movie shot in an aspect ratio of 16:9 is being played on a screen 118 with an aspect ratio of 4:3), one or more blank parts (e.g., a top blank bar and a bottom blank bar) may be inserted around each video frame when the video frame is being displayed on the screen 118. In such cases, the extension image may be generated with respect to the one or more blank parts, in order to provide the backlight effect to "expand" the screen 118.

Figure 5:
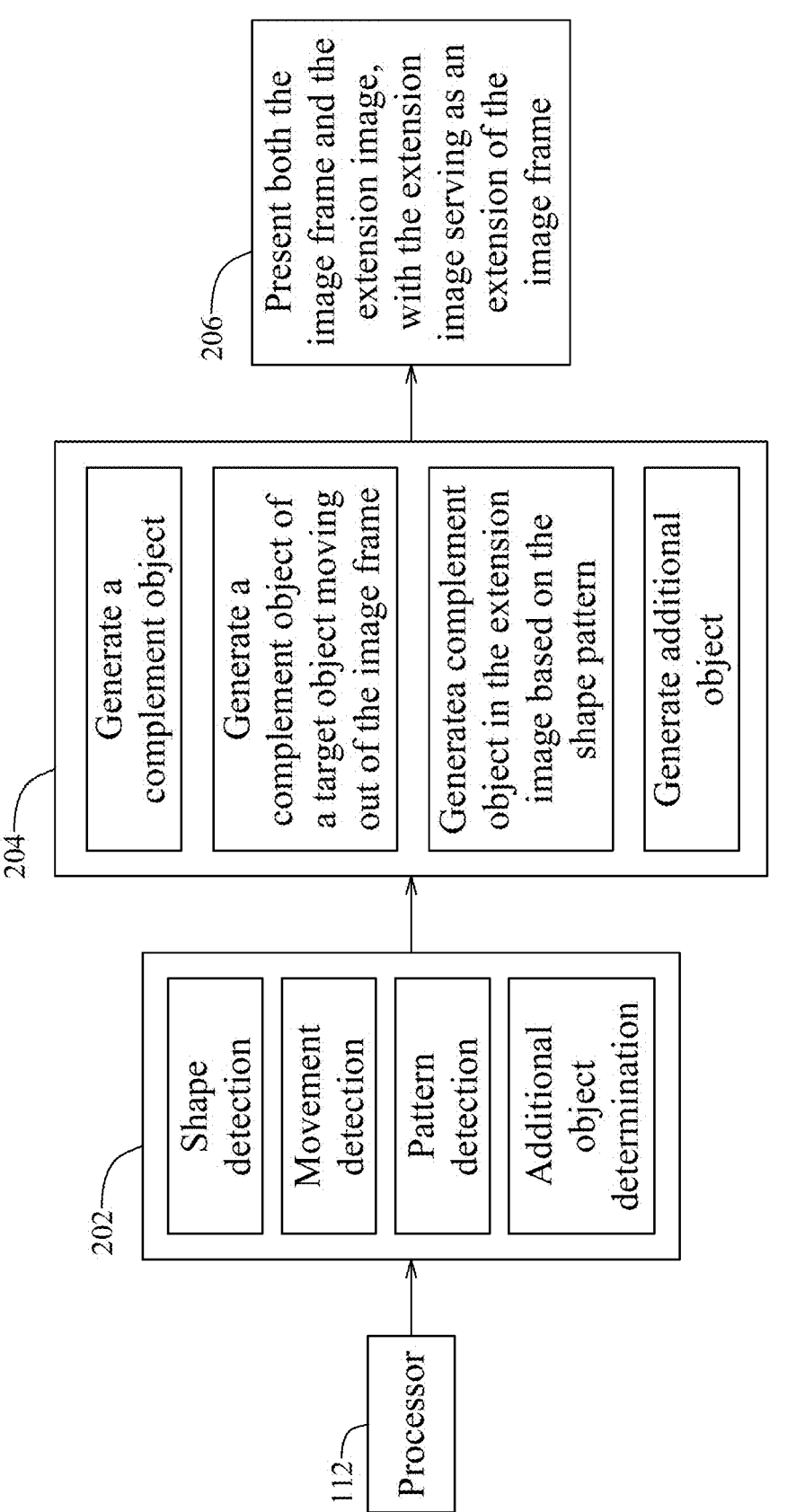
FIG. 5 is a flow chart that illustrates a number of exemplary aspects for the operations of steps 202 and 204 according to one embodiment of the disclosure.

In different implementations, the operations of step 202 may include a number of different aspects. FIG. 5 is a flow chart that illustrates a number of exemplary aspects for the operations of steps 202 and 204 according to one embodiment of the disclosure. It is noted that while the operations of step 202 include all the aspects in the embodiment depicted in FIG. 5, in other embodiments, the operations of step 202 may only include one or some of the aspects shown in FIG. 5.

In the aspect of "shape detection", the processor 112 performs a shape detection operation on a video frame in an attempt to determine a shape of an object in the video frame. In some embodiments, the shape detection operation may be done by extracting the metadata of the video frame, and executing an edge detection algorithm to determine a contour for each of the objects contained in the video frame.

Figure 6:
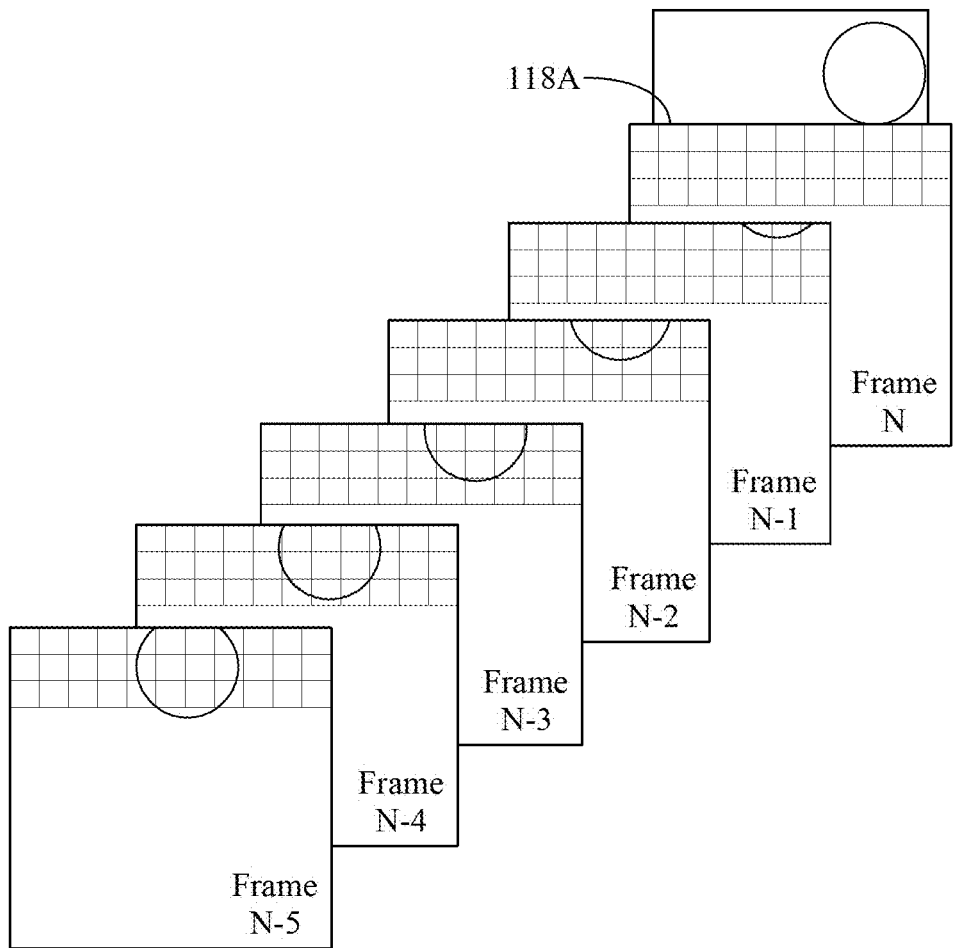
FIG. 6 illustrates an exemplary manner for performing a shape detection operation and various operations on a number of successive video frames.

In one example shown in FIG. 6, by executing the shape detection operation on one of the video frames (e.g., frame N–5), the processor 112 may detect a part of a circular object (e.g., the Sun).

In the aspect of "movement detection", the processor 112 performs the above shape detection operation on a plurality of successive video frames to determine whether an object is "moving". That is to say, for a same object in each of the video frames, the processor 112 detects a movement pattern of the object based on the video frames. In the example of FIG. 6, six successive video frames are present (labeled sequentially as frames N–5 to frame N), and the processor 112 performs the above shape detection operation on each of the successive video frames. The processor 112 may further execute a motion detection algorithm on the successive video frames to determine, based on the differences in the successive video frames with respect to the same object, whether the object is moving. In the example of FIG. 6, it can be determined that the circular object is rising, and is moving out of the video frames.

In the aspect of "pattern detection", after detecting an object, the processor 112 determines whether the object has a shape pattern. Specifically, the term "shape pattern" indicates that the object is a continuing object that extends beyond the video frame and has a specific recurring shape. For example, the object may be a wooden fence that includes a plurality of vertical wood planks that are spaced apart from one another and a plurality of horizontal wood planks that intersect the vertical wood planks. In such a case, the object may be said to have a shape pattern.

In the aspect of "additional object determination", the processor 112, after detecting an object, executes a machine learning algorithm to determine whether an additional object should be present at a location that is beyond the boundary of the video frame. For example, in a case where the video frame includes part of a baseball field with a first base, a second base and a third base, the processor 112 may determine that a home base should be located at a location that is beyond the boundary of the video frame. In another example, in a case where the video frame includes the sky, the processor 112 may determine whether an additional cloud, a bird or other objects may be present at the location beyond the boundary of the video frame.

After performing one or more of these aspects of step 202, the processor 112 determines which of the detected objects should serve as the object needed for generating the extend frame to be projected. In embodiments, for each video frame, at least one target object is typically present.

Figure 7:
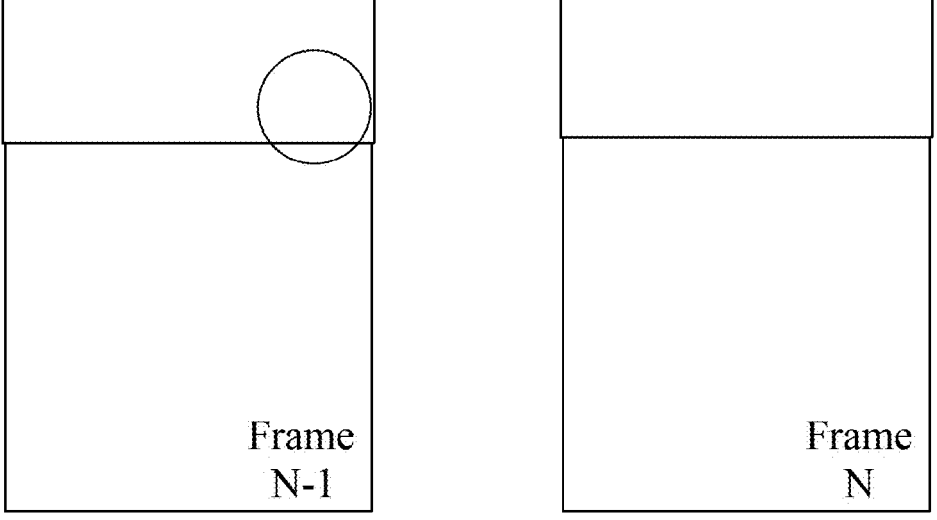
FIG. 7 illustrates an alternative manner for performing the shape detection operation and various operations on the video frames.

While FIG. 6 illustrates one exemplary manner for performing the operations of step 202 on the video frames, FIG. 7 illustrates an alternative manner for performing the operations of step 202. Specifically, in the example of FIG. 7, the processor 112 executes one or more pre-trained neural networks for performing the operations of step 202. The training may be done by preparing a number of reference video frames and a number of cropped video frames each of which is cropped from one of the reference video frames. Then, the neural network may be trained to try to use the cropped video frames to generate extension images, to make one cropped video frame and the extension image to cooperatively look like a corresponding reference video frame. That is to say, in trying to generate an extension image from a cropped video frame, the corresponding reference video frame may be used as a reference.

Generally, the example of FIG. 6 may be used on video frames that have a relatively lower resolution, while the example of FIG. 7 may be used on video frames that have a relatively higher resolution, but the actual implementations are not limited to such.

Then, in step 204, the processor 112 executes a generative algorithm to generate an extension image based on at least one target object.

In the example of FIG. 5, the operations of step 204 also includes a number of aspects that correspond respectively with the aspects of step 202. Specifically, for a target object in a video frame, after the shape detection of the target object is completed in step 202, in step 204, the processor 112 determines whether the target object is completely included in the video frame. In the example of FIG. 6, the circular object is not completely included in the video frame labeled frame N–1. In a case where the target object is not completely included in the video frame, the processor 112 generates a complement object that corresponds to the entirely of the target object and that is to be located in a part of the extension image which corresponds to a location of the target object in the video frame. Generally, the complement object would have a shape that is different from the shape of the target object.

In embodiments, the complement object is generated such that when the video frame and the extension image are presented by the display apparatus 110, the target object and the complement object cooperatively form a composite object that is similar to the complete target object in shape. In the example of FIG. 6 where the extension image only covers the edge 118A of the screen 118, for the video frame labeled frame N–1, the complement object is to complement the circular object that is moving away from the boundary of the video frame, so as to form a complete circular object with the target object. In the example of FIG. 4, for the (incomplete) mountain in the video frame, a complement object which is a partial mountain may be generated to extend the mountain to the left of the video frame.

After it is determined that a target object is moving by performing the "moving detection" aspect of step 202, the processor 112 determines, based on the movement pattern of the target object, whether the target object has moved in such a way that part of the target object is no longer included in the video frame that is currently being processed.

In a case where it is determined that the target object (e.g., the circular object in FIG. 6) is only partly present in an video frame and is about to move out of the video frame, the processor 112 generates a complement object that corresponds to the target object and that is to be located in part of the extension image which corresponds to a location of the target object in the video frame.

For example, in the example of FIG. 6, since the target object (the circular object) is only partly present in the video frames labeled frames N–5 to N–1 and is moving out of the video frames from an upper part thereof, for each of these video frames, the processor 112 generates a different complement object to complete (at least partially) the circular object and accommodate the movement of the circular object, in order to give the effect that the circular object is moving from the video frame beyond the television screen 118, i.e., into the extension image and beyond.

Furthermore, in a case where it is determined that the target object has moved completely out of the video frame, the processor 112 generates a complement object in the extension image to have a shape of the composite object, or part of the object that "left" the video frame the latest.

For example, in the example of FIG. 6, in the video frame labeled frame N, the circular object is no longer present (i.e., the circular object has moved completely out of the video frame). In such a case, the processor 112 generates an entire circular object (in the extension image) that is to be presented above the video frame. In subsequent video frames, the processor 112 may generate the entire circular object at different locations to give the effect that the circular object is continuously moving in the movement pattern.

In a case where it is determined that the target object indicates a shape pattern in step 202, the processor 112 generates the complement object in the extension image based on the shape pattern. In the example where a wooden fence is detected, the processor 112 may generate the complement object to have the form of another section of the wooden fence that extends into the extension image.

After determining that an additional object should be at a location that is beyond the boundary of the video frame in step 202, the processor 112 generates an additional object that is not present in the video frame based on the target object, and generates the extension image that includes the additional object. For example, in a case where the video frame includes a part of a baseball field with a first base, a second base and a third base, the processor 112 may generate a home base located at a location that is based on the locations of the first, second and third bases. In another example, in a case where the video frame includes the sky, the processor 112 may generate an additional cloud, a bird or other objects to be included in the extension image.

It is noted that in some embodiments, in generating the extension image, the background of the video frame may be utilized as well. Using FIG. 4 as an example, the extension image 119 includes four sub-images (labeled 119A, 119B, 119C and 119D, respectively), and the four sub-images surround the video frame. Since each of the sub-images is extended from some parts of the background of the video frame (e.g., the sky, the body of water, the mountain, etc.), in addition to the object(s), if any, generated for the sub-images, the background should also be incorporated into the sub-images. For example, the sub-image 119A should incorporate the background of the sky, the sub-images 119B and 119D should incorporate the background of the sky, the mountain and the body of water, and the sub-image 119C should incorporate the background of the body of water.

It is noted that in some embodiments, in generating the extension image, other data associated with the video frame may be utilized. For example, in a case that the video frame is extracted from a video, metadata and/or audio associated with the video frame may also be utilized. Using the metadata, the processor 112 may determine information of the video that includes the video frame, and determine whether to adjust the characteristics of the extension image. For example, in a case that the video, at the time of the video frame, has a musical beat, the extension image may be generated to have an increased brightness.

Then, in step 206, the processor 112 presents both the video frame and the extension image, with the extension image serving as an extension of the video frame. Specifically, in some embodiments, the processor 112 may control the screen 118 to present the video frame, and control the backlight projection unit 120 to present the extension image. In some alternative embodiments where the screen 118 is not completely used to display the video frame and at least one blank part is left on the screen 118, the processor 112 may generate the extension image to fill the at least one blank part, and control the screen 118 to also display the extension image.

The extension image generated by the above mentioned method, when presented to the user in addition to the video frame, gives a more satisfactory viewing experience to the user.

It is noted that in the above operations, the algorithm and the neural networks used may be obtained using commercially available products.

It is noted that in some embodiments, the above operations of the method may be implemented using a postprocessor that is separated from the processor 112.

In brief, the embodiments of the disclosure provide a method and a display apparatus system for generating an extension image from an video frame. In the method, the content shown on the screen and the extension image cooperatively gives a relatively more natural extension to the original video frame, and can therefore provide a broader, more immersive viewing experience to the viewers.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for generating an extension image from a video frame, the method being implemented using a display apparatus system and comprising the steps of:

in response to receipt of a video frame, processing the video frame to detect a target object therefrom, and executing a generative algorithm to generate the extension image based on the target object; and presenting the video frame and the extension image, wherein the extension image serves as an extension of the video frame, wherein the generating of the extension image includes:

performing a shape detection operation on the video frame to determine whether the target object is completely included in the video frame;

in a case where the target object is not completely included in the video frame, generating a complement object in a part of the extension image that corresponds to a location of the target object in the video frame;

wherein the complement object is generated such that in presenting the video frame and the extension image, the target object and the complement object cooperatively form a composite object that is similar to the target object in shape; and wherein the processing of the video frame further includes determining whether an object detected is to serve as a target object and/or background of the video frame, and the generation of the extension image includes utilizing the background of the video frame.

2. The method as claimed in claim 1, the display apparatus system including a screen and a backlight projection unit configured to project light outwardly of the screen, wherein the presenting of the video frame and the extension image includes presenting the video frame on the screen and presenting the extension image using the backlight projection unit, such that the extension image is presented outwardly of the video frame.

3. The method as claimed in claim 2, the backlight projection unit including a plurality of backlight projection components each projecting light outwardly of a corresponding section of the screen, wherein the generating of the extension image includes generating a plurality of extension sub-images, and the presenting of the video frame and the extension image includes presenting the video frame on the screen and presenting the plurality of extension sub-images using the plurality of backlight projection components, respectively, and wherein the extension image is presented to surround the video frame.

4. The method as claimed in claim 1, further comprising:

determining whether the target object indicates a shape pattern;

in a case where the target object indicates a shape pattern, generating another complement object in the extension image based on the shape pattern.

5. The method as claimed in claim 1, wherein the generating of the extension image includes generating an additional object that is not present in the video frame based on the target object, and generating the extension image that includes the additional object.

6. A method for generating an extension image from a video frame, the method being implemented using a display apparatus system and comprising the steps of:

in response to receipt of a video frame, processing the video frame to detect a target object therefrom, and executing a generative algorithm to generate the extension image based on the target object;

presenting the video frame and the extension image, wherein the extension image serves as an extension of the video frame;

in response to receipt of a video that includes a plurality of successive video frames, for each of the successive video frames, processing the video frame to detect a target object therefrom, and executing a generative algorithm to generate the extension image based on the target object;

detecting a movement pattern of the target object based on the video frames; and for each of the successive video frames, determining, based on the movement pattern of the target object, whether the target object has moved such that at least a part of the target object is not included in the video frame, and in the affirmative, generating a complement object in a part of the extension image that corresponds to a location of the target object in the video frame;

wherein the complement object is generated such that in presenting the video frame and the extension image, the target object and the complement object cooperatively form a composite object that is similar to the entirety of the target object in shape.

7. The method as claimed in claim 6, further comprising:

for each of the successive video frames, determining whether the target object has moved completely out of the video frame, and in the affirmative, generating the complement object in the extension image to have a shape of the composite object.

8. A display apparatus system for generating an extension image from a video frame, the display apparatus system comprising a processor and a screen, wherein:

in response to receipt of the video frame, the processor processes the video frame to detect a target object therefrom, and executes a generative algorithm to generate the extension image based on the target object; and the processor controls the screen to present the video frame, and presents the extension image, wherein the extension image serves as an extension of the video frame;

wherein the processor generates the extension image by:

performing a shape detection operation on the video frame to determine whether the target object is completely included in the video frame; and in a case where the target object is not completely included in the video frame, generating a complement object in a part of the extension image that corresponds to a location of the target object in the video frame; and wherein the complement object is generated such that in presenting the video frame and the extension image, the target object and the complement object cooperatively form a composite object that is similar to the entirety of the target object in shape.

9. The display apparatus system as claimed in claim 8, further comprising a backlight projection unit configured to project light outwardly of the screen, wherein the processor further controls the backlight projection unit to present the extension image such that the extension image is presented outwardly of the video frame.

10. The display apparatus system as claimed in claim 9, wherein:

the backlight projection unit includes a plurality of backlight projection components each projecting light outwardly of a corresponding section of the screen;

the processor generates of the extension image by generating a plurality of extension sub-images, and controls the backlight projection unit to present the plurality of extension sub-images using the plurality of backlight projection components, respectively, such that the extension image is presented to surround the video frame.

11. The display apparatus system as claimed in claim 8, wherein the processor further performs the operations of:

determining whether the target object indicates a shape pattern;

in a case where the target object indicates a shape pattern, generating another complement object in the extension image based on the shape pattern.

12. A display apparatus system for generating an extension image from a video frame, the display apparatus system comprising a processor and a screen, wherein:

in response to receipt of the video frame, the processor processes the video frame to detect a target object therefrom, and executes a generative algorithm to generate the extension image based on the target object; and the processor controls the screen to present the video frame, and presents the extension image, wherein the extension image serves as an extension of the video frame;

wherein the processor further performs the operations of:

in response to receipt of a video that includes a plurality of successive video frames, for each of the successive video frames, processing the video frame to detect a target object therefrom, and executing a generative algorithm to generate the extension image based on the target object;

detecting a movement pattern of the target object based on the video frames; and for each of the successive video frames, determining, based on the movement pattern of the target object, whether the target object has moved such that at least a part of the target object is not included in the video frame, and in the affirmative, generating a complement object in a part of the extension image that corresponds to a location of the target object in the video frame; and wherein the complement object is generated such that in presenting the video frame and the extension image, the target object and the complement object cooperatively form a composite object that is similar to the entirety of the target object in shape.

13. The display apparatus system as claimed in claim 12, wherein the processor further performs the operations of:

for each of the successive video frames, determining whether the target object has moved completely out of the video frame, and in the affirmative, generating the complement object in the extension image to have a shape of the composite object.

* * * * *